US009483775B1

(12) United States Patent
Kim et al.

(10) Patent No.: US 9,483,775 B1
(45) Date of Patent: Nov. 1, 2016

(54) CUSTOMER-GENERATED DEALS

(71) Applicant: Time Warner Cable Enterprises LLC, New York, NY (US)

(72) Inventors: John Y. Kim, Centreville, VA (US); Vijay Venkateswaran, Fairfax, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 163 days.

(21) Appl. No.: 13/849,973

(22) Filed: Mar. 25, 2013

Related U.S. Application Data

(60) Provisional application No. 61/763,658, filed on Feb. 12, 2013.

(51) Int. Cl.
    *G06Q 30/00*     (2012.01)
    *G06Q 30/02*     (2012.01)

(52) U.S. Cl.
    CPC .................................. *G06Q 30/0207* (2013.01)

(58) Field of Classification Search
    CPC ....................................................... G06Q 30/00
    USPC ............................................................ 705/14
    See application file for complete search history.

(56) References Cited

U.S. PATENT DOCUMENTS

| | | | |
|---|---|---|---|
| 9,171,315 B1 * | 10/2015 | Jayaram | G06Q 30/0222 |
| 2001/0049636 A1 * | 12/2001 | Hudda | G06Q 30/06 705/26.1 |
| 2011/0125569 A1 * | 5/2011 | Yoshimura et al. | 705/14.36 |
| 2012/0054109 A1 * | 3/2012 | Selsby | G06Q 30/06 705/80 |
| 2013/0024261 A1 * | 1/2013 | Main et al. | 705/14.23 |
| 2013/0117086 A1 * | 5/2013 | Mesaros | G06Q 30/0222 705/14.25 |
| 2013/0166360 A1 * | 6/2013 | Kshetramade et al. | 705/14.1 |

* cited by examiner

*Primary Examiner* — Eric Netzloff
(74) *Attorney, Agent, or Firm* — Chapin IP Law, LLC

(57) ABSTRACT

A deal manager executing on computer hardware receives a discount offer proposal from a first consumer. The deal manager forwards the discount offer proposal to one or more retail suppliers. The discount offer can include proposed terms such as a conditional modification to an original retail price of a respective retail item offered for sale by the supplier. In response to receiving, from the supplier, acceptance of terms as specified by the discount offer proposal, the deal manager or other suitable resource initiates distribution of terms associated with the approved discount offer to the first consumer and/or a second consumer. The second consumer can be one of multiple consumers to which the approved discount offer is distributed. Accordingly, consumers can propose deals that are, in turn, used by other consumers.

27 Claims, 15 Drawing Sheets

*FIG. 7*

| Pertinent Data | Pertinent Information |
|---|---|
| *Buyer Information* | • Name and Contact Information<br>• Physical Address<br>• Credit Card Information<br>• Personal Preferences (Optional) |
| *Merchant Information* | • Name and Contact Information<br>• Physical Address<br>• Bank Routing/Account Information<br>• PayPal Account Information |
| *Deal Description* | • Deal Name<br>• Deal Original and Negotiated Price<br>• Deal Expiration Date<br>• Deal Volume Commitment Required<br>• Deal Incentive (Optional) |

FIG. 9  Deal Platform Software & System Components

CUSTOMER-GENERATED DEALS

RELATED APPLICATIONS

This application is related to and claims the benefit of earlier filed U.S. Provisional Patent Application Ser. No. 61/763,658 entitled "Customer-Generated Deal Platform Apparatus, Method, and Computer Program Product," filed on Feb. 12, 2013, the entire teachings of which are incorporated herein by this reference.

BACKGROUND

It is well-known to provide physical coupons that can be exchanged for a financial discount or rebate when purchasing a product. Coupons may be issued, for example, by manufacturers of consumer-packaged goods or by retailers, to be presented in stores when making a purchase. They can be distributed through mail, in publications, over the Internet, in a brick and mortar store, and/or over mobile devices such as cellular telephones.

Groupon, Inc. of Chicago, Ill. operates the GROUPON® web site which features discounted gift certificates usable at local or national companies. LivingSocial Inc. of Washington, D.C. operates the LIVINGSOCIAL® web site which features discounted gift certificates usable at local or national companies.

BRIEF DESCRIPTION OF EMBODIMENTS

Embodiments herein include a customer-generated deal platform facilitating deals amongst one or more prospective buyers and one or more prospective sellers.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments as discussed herein can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments as discussed herein can be implemented in the form of an apparatus including a memory and at least one processor that is coupled to the memory and operative to perform, or facilitate performance of, exemplary method steps. Yet further, in another aspect, one or more embodiments as discussed herein can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Techniques as discussed herein can provide substantial beneficial technical effects. For example, one or more embodiments provide on or more of:

facilitation of user-generated coupon transactions;
monitoring of user transactions for goal tracking to trigger fund transfer;
enhanced security via platform-centric transaction tracking to ensure that, as appropriate, participation is limited to properly authorized individuals and/or that funds are safeguarded.

Now, more specifically, one embodiment herein includes computer hardware logic (such as computer hardware, computer logic, etc.) and a corresponding deal manager configured to receive a proposal of a coupon from a first party such as a consumer or prospective buyer. The proposed coupon (i.e., a deal including a reduced price of a retail item) can indicate a modified purchase price of a retail item for sale by a second party such as a prospective seller. On behalf of the prospective buyer or consumer, the deal manager presents the proposal to the second party (prospective seller). From the second party, the deal manager receives approval of the proposed coupon at the modified purchase price. In one embodiment, approval means that the second party has agreed to sale of a retail item at a specified price. Subsequent to approval and potential repeated negotiations between the parties, the deal manager provides notification of the received approval of the coupon to the first party. The approved coupon can be forwarded to one or more consumers for use. Accordingly, embodiments herein include enabling a respective consumer to approach a prospective buyer and bargain for a price and/or sales terms on behalf of multiple prospective buyers who, thereafter, may or may not assent to the offer.

In accordance with yet further embodiments, a deal manager application executing on computer hardware logic receives input originated from a first consumer. The deal manager forwards the input as a discount offer proposal to the supplier. As mentioned, the input can include proposed terms specifying a conditional sale agreement. The deal manager generates an approved discount offer in response to receiving, from the supplier, acceptance of the sales agreement. The deal manager generates the discount offer in accordance with the input from the first consumer and terms agreed upon by the seller. In one embodiment, the discount offer specifies a conditional modification to an original retail price of a retail item offered for sale by the supplier. The deal manager or other suitable resource initiates distribution of the approved discount offer to the first consumer and/or a second consumer. The second consumer can be part of multiple consumers to which the discount offer is distributed.

Note that the computer hardware logic and/or deal platform as discussed herein can include one or more computerized devices, networks, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by a processor of a respective computer device, cause the processor or multiple processors of the system to: receive input originated from a first consumer; generate a discount offer in accordance with the input from the first consumer, the coupon offer specifying a conditional modification to a retail price of a retail item offered for sale by a supplier; and initiate distribution and/or notification of the discount offer to a second consumer.

Yet another embodiments herein includes a method and computer readable storage medium and/or system having instructions stored thereon. The instructions, when executed by a processor of a respective computer device, cause the processor or multiple processors of the system to: receive a proposal of a coupon from a first party, the proposed coupon indicating a modified purchase price of a retail item for sale by a second party; present the proposal to the second party; from the second party, receiving approval of the proposed coupon at the modified purchase price, the approval indicating acceptance by the second party of the modified purchase price; and provide notification of the received approval of the coupon to the first party.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for facilitating communications, deals, transactions, etc., between prospective buyers and prospective sellers. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, embodiments herein can be viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 7 shows exemplary deal components, in accordance with embodiments herein.

DETAILED DESCRIPTION AND FURTHER SUMMARY OF EMBODIMENTS

One or more embodiments advantageously facilitate connecting potential customers to local businesses. Heretofore, incentives for potential customers to engage particular businesses have mainly been driven by discount deals and/or coupons generated the businesses or middlemen such as the GROUPON® web site. However, conventional business originated coupons do not necessarily anticipate customers' wants and needs in the particular time frame.

One or more embodiments as discussed herein provides a model which allows individual customers to generate coupons on the businesses' behalf. Under this model, businesses allow individuals to generate such coupons and these coupons are vetted by the businesses and identifiable by unique codes.

A deal manager executing on computer hardware logic receives a discount offer proposal from a first consumer. The deal manager forwards the discount offer proposal to one or more retail suppliers. The discount offer can include proposed terms such as a conditional modification to an original retail price of a respective retail item offered for sale by the supplier. In response to receiving, from the supplier, acceptance of terms as specified by the discount offer proposal, the deal manager or other suitable resource initiates distribution of terms associated with the approved discount offer to the first consumer and/or a second consumer. The second consumer can be one of multiple consumers to which the approved discount offer is distributed. Accordingly, consumers can propose deals that are, in turn, used by other consumers.

In one or more embodiments, the unique codes are generated by the platform 102 (e.g., server 802 thereof). In some embodiments, a single unique code is associated with a given deal; in other embodiments, there can be a unique code for each individual participating in the deal. For example, in the "lamp" example discussed herein, there might be a unique code of "1239871213" for each coupon (originator and all the "buddies"), and there might be another deal for a bookcase available at a reduced price of $275 if an originator and five "buddies" participate. The "bookcase" deal might have a unique code of "1239876066" for each coupon (originator and all the "buddies"). In other cases, each participant has a unique code; for example, in the "lamp" case, the originator is coupon 1239871213-1, the first "buddy" is coupon 1239871213-2, and so on; in the "bookcase" case, the originator is coupon 1239876066-1, the first "buddy" is coupon 1239876066-2, and so on.

In one non-limiting example embodiment, the originators are incentivized by certain rewards (store credit, discounts, cash, and the like) if mutually agreed sales targets are met. The coupon originators then distribute the coupons to their contacts (e.g. friends, family, social media, and the like). Each coupon has an expiration time and the originator obtains his or her reward only if the specified sales targets are met before the expiration time.

Figure 11:
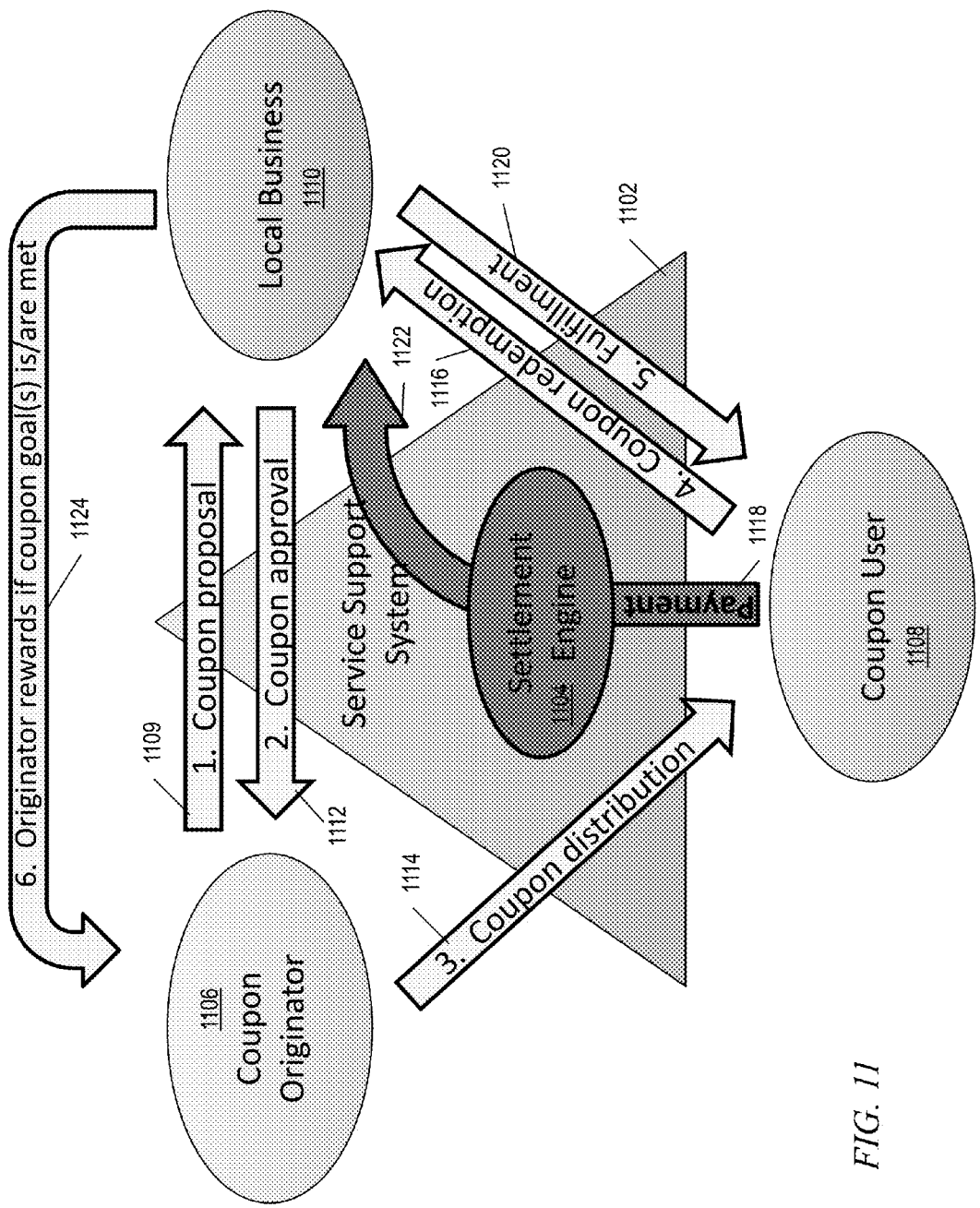
FIG. 11 depicts exemplary interrelationships between a service support system with a settlement engine, a coupon user, a local business, and a coupon originator, in accordance with embodiments herein.

Referring now to FIG. 11, one or more embodiments provide a service support system 1102 for generating coupons, reviewing and/or approving coupons, tracking transactions, and reward settlement via settlement engine 1104. Since the incentives of coupon originator 1106 are based on meeting a sales goal, the system is preferably able to accurately track resulting coupon transactions.

One way to track coupon transactions is to have the user 1108 redeem the coupon through the support system (deal platform or computer hardware logic) as follows. In a first step 1109, coupon originator 1106 proposes a coupon to a local business 1110. In a second step 1112, local business 1110 approves the coupon. In a third step 1114, coupon originator 1106 distributes the coupon(s) to one or more coupon users 1108. In a fourth step 1116, the coupon user redeems the coupon and makes a payment to the system 1102 via settlement engine 1104 for the merchandise and/or service.

This payment is depicted at 1118. Upon payment, the user receives an electronic receipt that can be used to retrieve the merchant/service at the business in a fifth, fulfillment, step 1120. When the business provides the merchandise and/or service to the user in the fulfillment step 1120, the system 1102 can be accessed to log the transaction and transfer the user payment to the business as indicated by arrow 1122. Preferably, the user may obtain a full refund if the transaction is not logged into the system 1102 by a certain time. In a sixth step 1124, the originator 1106 receives a reward if the coupon goal(s) are met. Furthermore in this regard, once the deal threshold has been met within the time limit, further sales may be treated as final, i.e., the prospective purchaser is not permitted to back out after committing.

One or more embodiments may be useful in one or more of the following scenarios: local advertisements; group buying; online coupons; and/or online deals (which may be hosted, for example, by an Internet service provider such as a cable multi-services operator (MSO) or the like via its online properties).

Current business- and/or middleman-originated deals and/or coupons do not necessarily anticipate potential customers' current needs and/or wants. One or more embodiments as discussed herein allow individuals to tailor coupons based on their needs. One or more embodiments also allow businesses to leverage individuals' relationships (e.g. friends and/or family) in connecting to potential customers.

One significant difference that one or more embodiments exhibit as compared to prior techniques is the ability to allow consumers to drive deals they desire while yet assuring that those deals are profitable to the businesses by securing certain sales and/or volume targets from the deal-originating consumers. One or more embodiments allows everyday consumers to provide services to businesses similar to those provided by coupon web sites, except that the deals are more closely focused on the needs and desires of both the customers and businesses.

In another aspect, one or more embodiments provide a local shopping deal generation and distribution platform based on a mobile application and a web-based commerce platform. One or more embodiments provide a buyer-merchant collaboration platform that enables buyers to identify, negotiate for, and purchase retail products and/or services from local merchants. One or more embodiments provide a deal shopping and merchant services platform that combines smart-phones, social networks and contacts, online deals and payments, and reporting and analytics.

FIG. 11 is a specific coupon embodiment; however, it will be realized that while different embodiments involve paper or other physical coupons and/or electronic coupons, some embodiments are generally applicable to consumer-generated deals and do not necessarily involve physical or electronic coupons. In some embodiments, the aforementioned unique codes are stored in the platform and participants present suitable identification when visiting the merchant to fulfill the deal.

Figure 1:
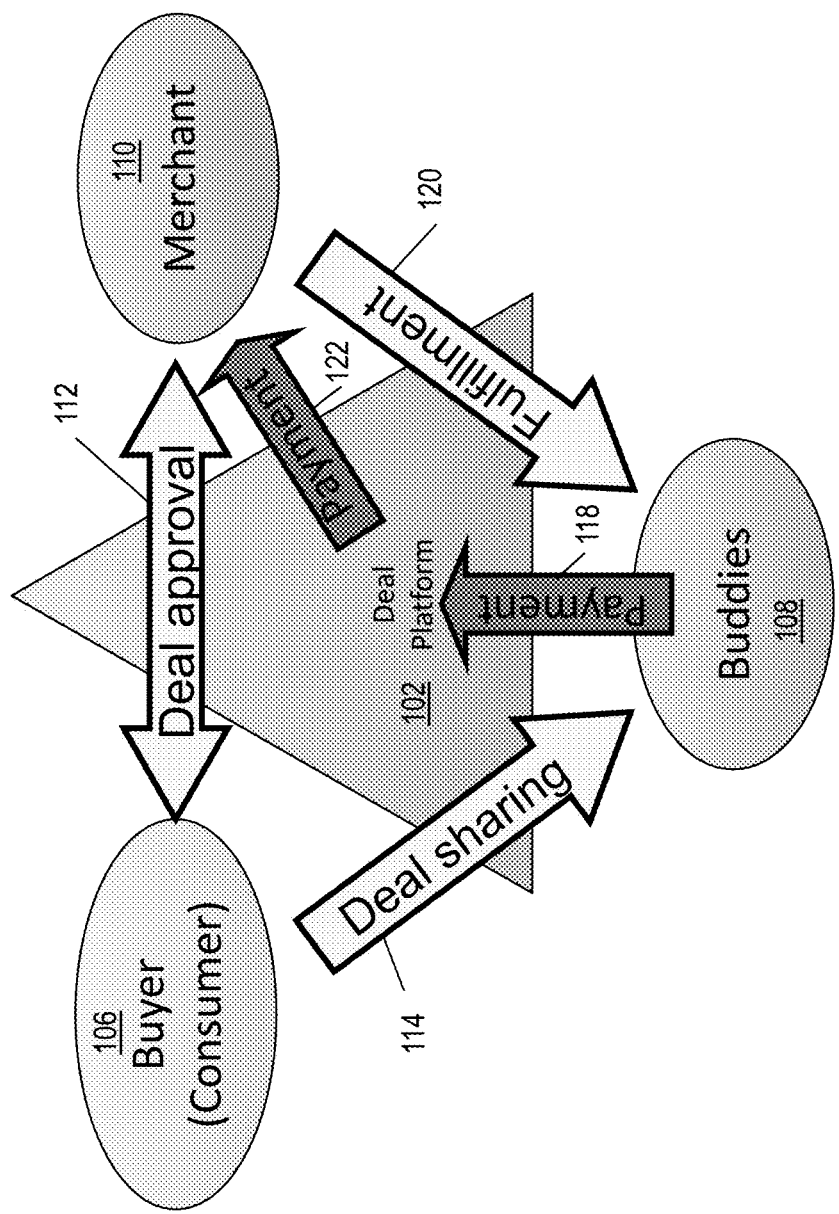
FIG. 1 depicts exemplary interrelationships amongst a deal platform, consumers, merchants, and friends, family and contacts (buddies) of the consumer, in accordance with embodiments herein.

Referring now to FIG. 1, one or more embodiments provide a deal platform 102 which allows a buyer (consumer) 106 and a merchant 110 to enter and track mutually agreed deals. This tracking may involve physical or electronic coupons, or deal terms and conditions may simply be kept track of by platform 102 without any use of coupons. The process of proposal of a deal by the buyer 106 and approval by the merchant 110 is depicted at 112. The buyer 106 is provided by platform 102 with tools to create and distribute digital advertisements to friends, family, and/or contacts (referred to generally herein as "Buddies" 108), as seen at 114. Platform 102 preferably guides all the parties to successful deal completion by performing deal commitment tracking, payment collection, and merchant settlement. By way of a non-limiting example, payment from the "Buddies" to the platform is shown at 118, and payment from the platform to the merchant 110 is shown at 122. Fulfillment is shown at 120.

Figure 2:
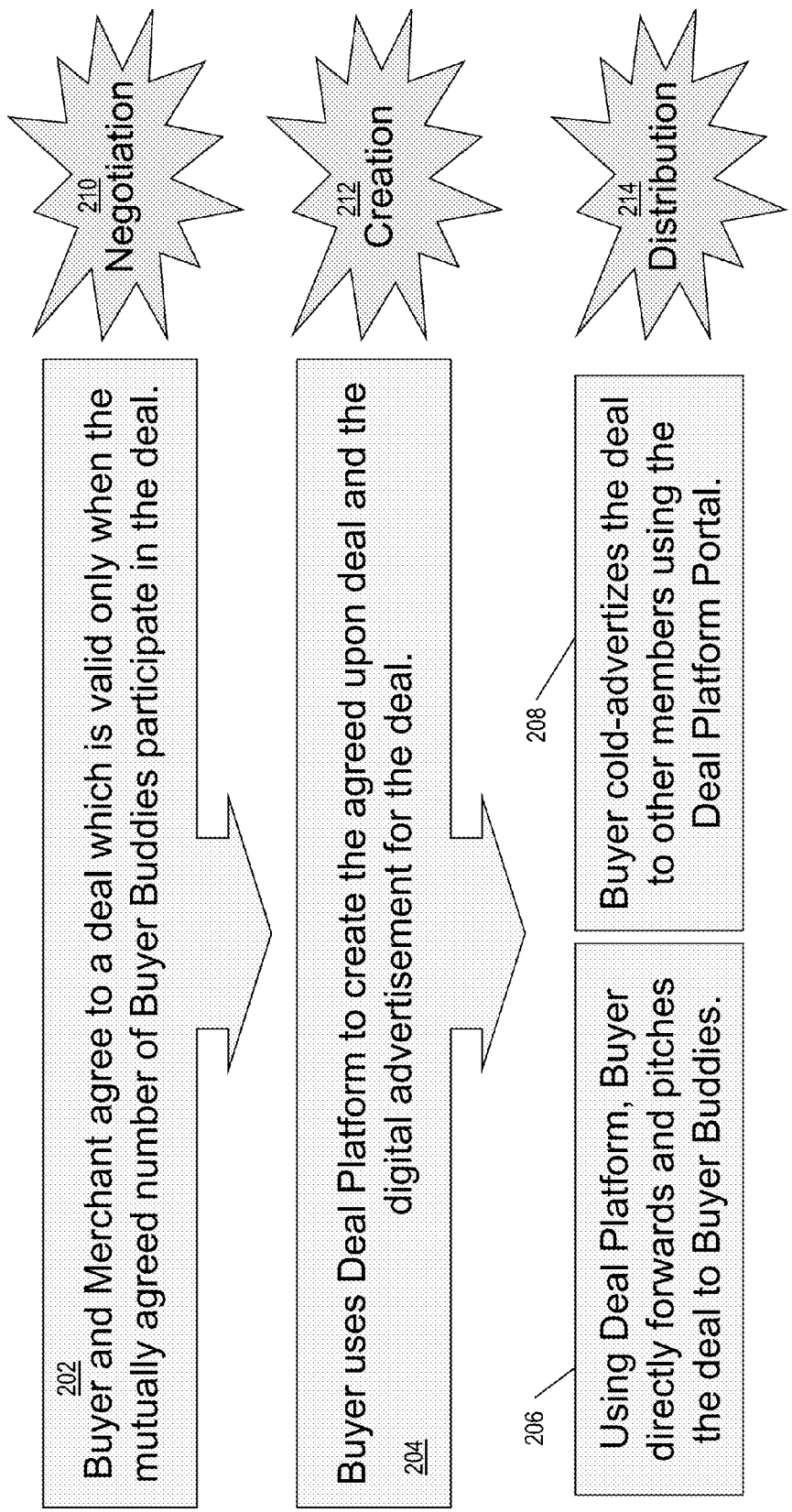
FIG. 2 is a flow chart of exemplary method steps, in accordance with embodiments herein.
Figure 3:
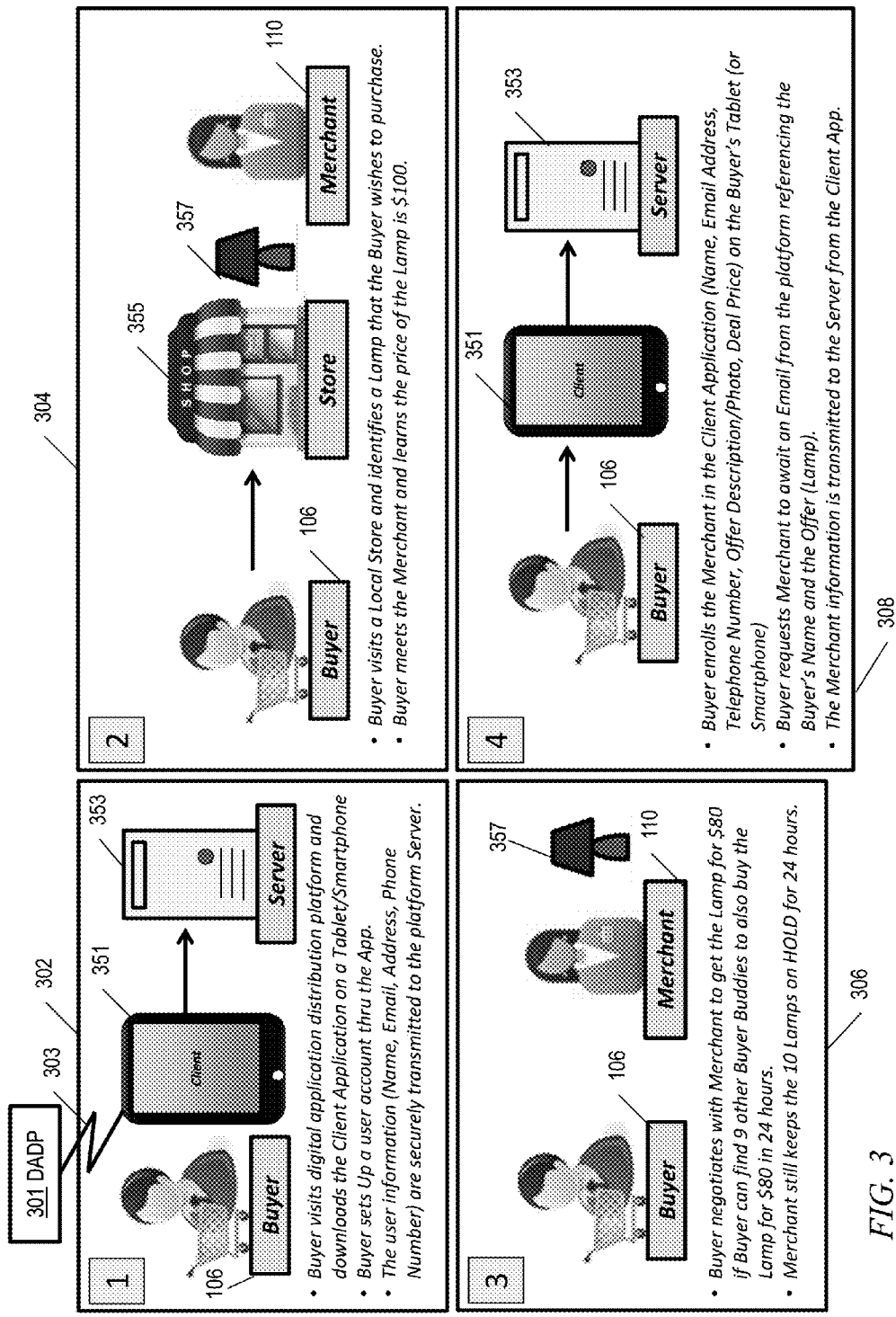
FIGS. 3-6 depict exemplary steps in a transaction ("deal"), in accordance with embodiments herein.
Figure 4:
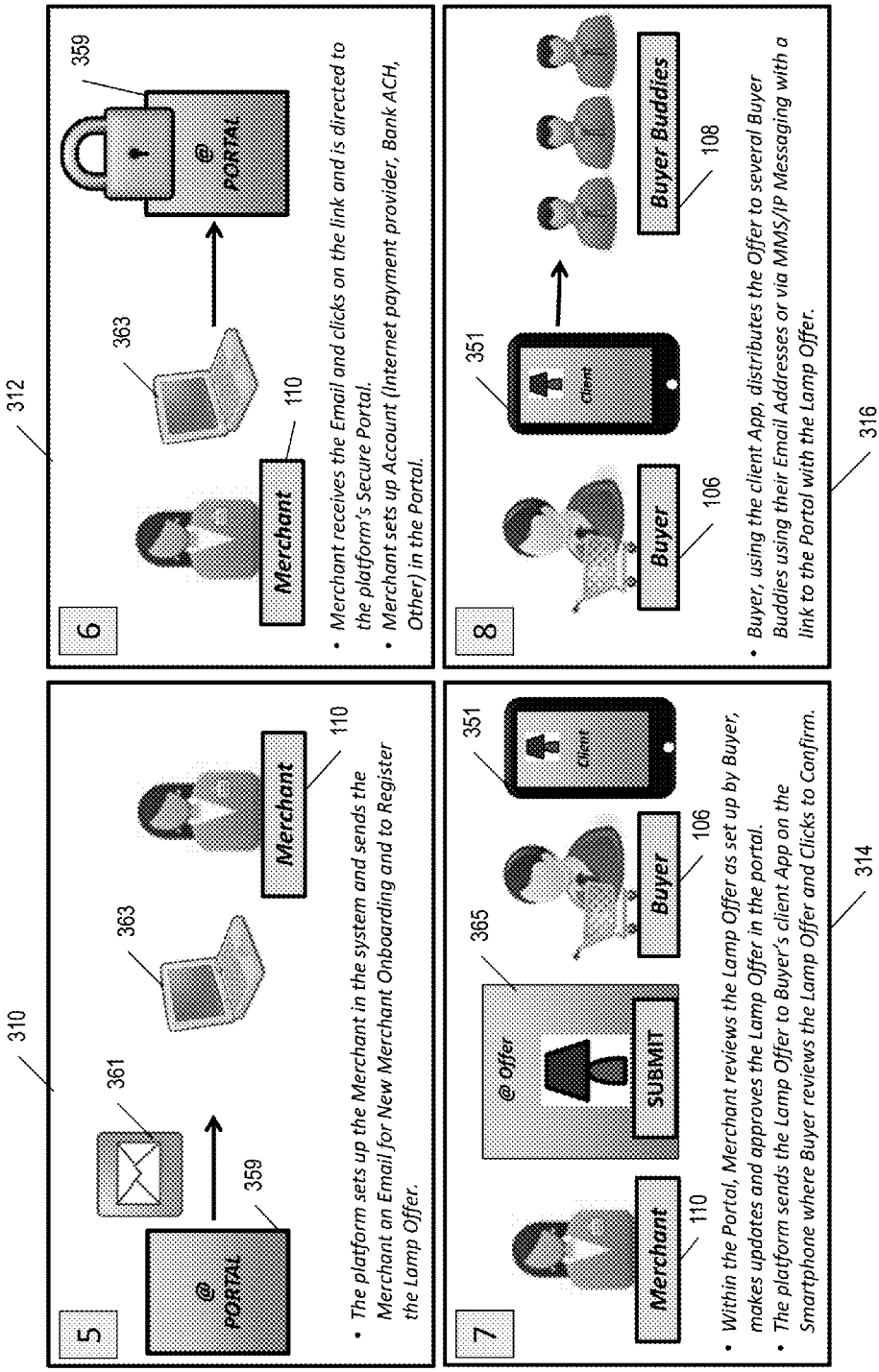
Figure 5:
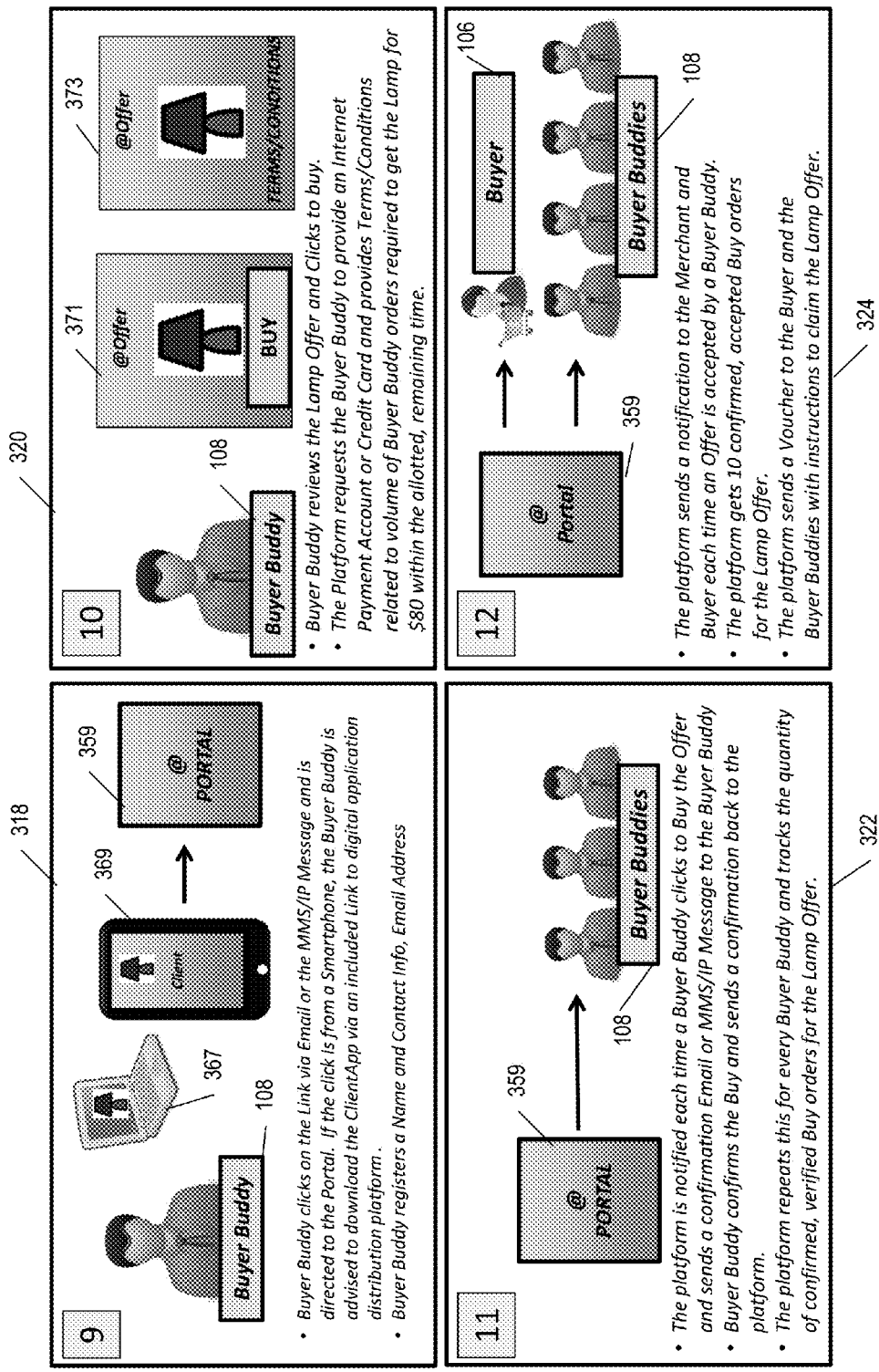
Figure 6:
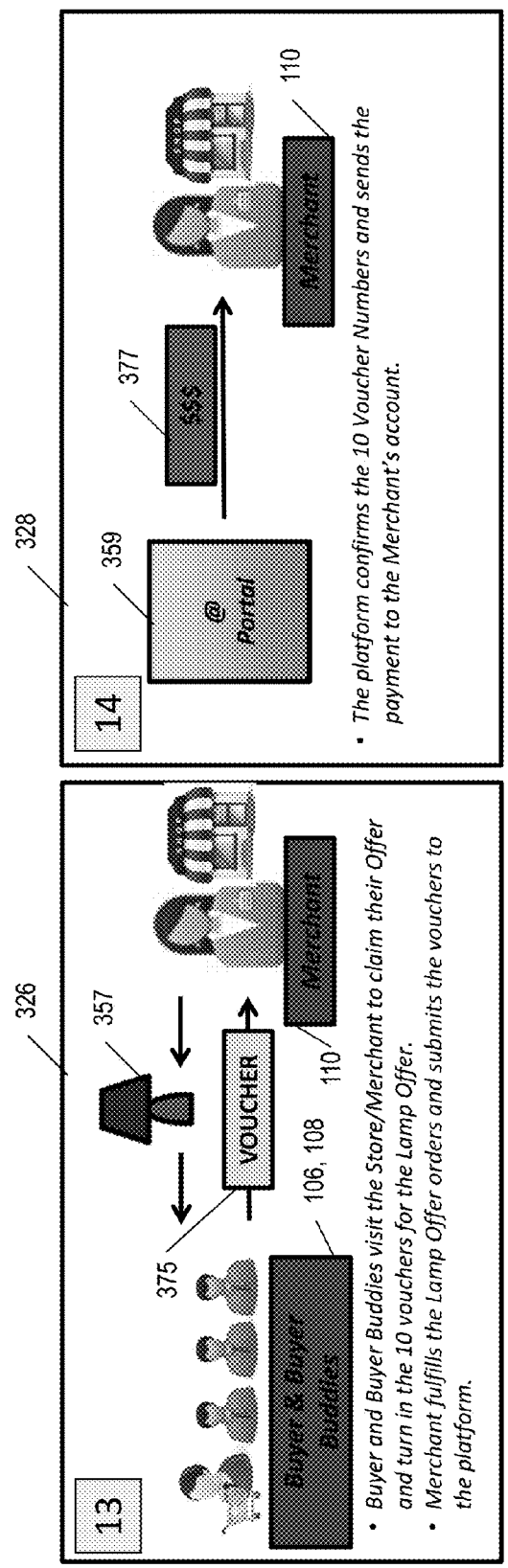

Referring now to the flow chart of FIG. 2, in one or more embodiments, the deal platform 102 of FIG. 1 facilitates the direct deal creation between the buyer and merchant, and for the buyer to drive the deal distribution to friends and contacts. In a negotiation phase 210, in step 202, the buyer and merchant agree to a deal which is valid only when the mutually agreed number of "Buddies" of the buyer participate in the deal. In a creation phase 212, in step 204, the buyer uses the deal platform to create the agreed-upon deal and the digital advertisement for the deal. In a distribution phase 214, in step 206, using the deal platform, the buyer directly forwards and "pitches" the deal to his or her "Buddies" (i.e., tries to convince the "Buddies" to participate). In another step 208 of phase 214, the buyer cold-advertizes the deal to other members (i.e., other people registered with or otherwise connected to the platform 102, who have consented to being notified of potential deals, but who may not be friends or family of this particular buyer) using a portal function of the deal platform 102.

FIGS. 3-6 present a non-limiting illustrative deal, which highlights exemplary deal service and platform capabilities. In a first step 302, buyer 106 obtains an application, in accordance with one embodiment, for his or her client device 351. For example, buyer 106 visits a digital application distribution platform such as the APPLE APP STORE (mark of Apple Inc., Cupertino, Calif., USA) or GOOGLE PLAY (mark of Google Inc., Mountain View, Calif., USA) and downloads the client application ("app") from the digital application distribution platform (DADP) 301 (e.g., via wireless link 303) onto his or her tablet or smartphone 351, it being understood that other types of clients, such as, for example, desktop or laptop computers, could also be used. The buyer 106 sets up a user account through the app. During the set-up process, the user information (Name, Email, Address, Phone Number) are securely transmitted to the platform server 353. In one or more embodiments, server 353 is the platform server for the coupon platform not necessarily the server on which the DADP resides.

In a second step 304, the buyer 106 visits a local store 355 and identifies a lamp 357 that the buyer 106 wishes to purchase. Buyer 106 meets the merchant 110 and learns that the price of the lamp 357 is $100. In a third step 306, buyer 106 negotiates with merchant 110 to obtain the lamp 357 for $80 if buyer 106 can find nine other "Buddies" to also buy the lamp 357 (i.e., multiple instances of the same type of lamp) for $80 in twenty-four hours. Merchant 110 keeps the ten lamps 357 on HOLD for twenty-four hours. In a fourth step 308, buyer 106 enrolls the merchant 110 in the client application (e.g., Name, Email Address, Telephone Number, Offer Description/Photo, Deal Price) on the buyer's tablet (or smartphone) 351. The buyer requests merchant 110 to await an email from the platform referencing the buyer's name and the Offer (Lamp). The merchant information is transmitted to the server 353 from the client app.

In a fifth step 310, the portal function 359 of the platform 102 sets up the merchant 110 in the system and sends the merchant an email 361 for new merchant on-boarding and to register the lamp offer. It is worth noting that the terms "portal" and "platform" are used somewhat interchangeably herein; however, more precisely, the "platform" may be thought of as the system per se and the "portal" may be thought of as the manifestation of the system to the user, including user interface functionality. More specifically, the "portal" 359 can include:

a browser with downloaded html on computer 808, smartphone 810, and/or tablet 812, and/or a custom "app" on smartphone 810 and/or tablet 812;

secure web interfaces 814, 816, 818; and server 802.

Merchant 110 may receive this e-mail, for example, on a laptop computer 363. In a sixth step 312, merchant 110 receives the email, clicks on a suitable link therein, and is directed to the platform's secure portal (secure aspect of portal 359 being indicated by the lock icon). Merchant 110 sets up an account in the portal; such account permits payment, for example, via an Internet payment provider such as PAYPAL SUBSIDIARY OF EBAY INC., San Jose, Calif., USA; Bank Automated Clearing House (ACH); or other suitable technique.

In a seventh step 314, within the portal, merchant 110 reviews the lamp offer 365 as set up by buyer 106, makes updates, and approves the lamp offer in the portal. The platform sends the lamp offer to buyer's client app on the smartphone 351 where buyer 106 reviews the lamp offer and clicks to confirm assent. In an eighth step 316, buyer 106, using the client App on device 351, distributes the offer to several Buddies 108 using their email addresses or via Multimedia Messaging Service (MMS), SMS (Short Message Service), or other suitable IP-based or other messaging protocol, with a link to the portal with the lamp offer. In one or more embodiments, any suitable messaging modality capable of transmitting a customized link (e.g., web link, social media post, and the like) to the offer may be employed.

In a ninth step 318, one of the "Buddies" 108 using computer 367 or smartphone/tablet 369 clicks on the link via email or the MMS/IP or other message and is directed to the portal 359. If the click is from a smartphone 369, the "Buddy" is advised to download the aforementioned client app via an included link to the digital application distribution platform. The "Buddy" 108 registers with his or her name, contact information, email address, and so on. In a tenth step 320, the "Buddy" 108 reviews the lamp offer 371 and clicks to buy. The platform requests the "Buddy" 108 to provide Internet payment account information (e.g., PAYPAL), payment care (e.g., debit or credit card) information, or the like, and provides Terms and Conditions 373 related to the volume of "Buddy" orders required to get the lamp for $80 within the allotted, remaining time.

In an eleventh step 322, the platform (e.g., portal 359 thereof) is notified each time a "Buddy" 108 clicks to buy the offer and sends a confirmation email or MMS/IP or other message to the "Buddy" 108. "Buddy" 108 confirms the buy and sends a confirmation back to the platform. The platform repeats this for every "Buddy" 108 and tracks the quantity of confirmed, verified buy orders for the lamp offer. In a twelfth step 324, the platform (e.g., portal 359 thereof) sends a notification to the merchant and buyer 106 each time an offer is accepted by a "Buddy" 108. The platform obtains ten confirmed, accepted buy orders for the lamp offer. The platform sends a voucher to the buyer and each of the "Buddies" 108 with instructions on how to claim the lamp offer. In a thirteenth step 326, the buyer 106 and "Buddies" 108 visit the store of merchant 110 to claim their offer and turn in the ten vouchers 375 for the lamp offer, receiving ten lamps 357. The merchant 110 fulfills the lamp offer orders by providing the ten lamps 357, and submits the vouchers 375 to the platform. In a fourteenth step 328, the platform (e.g., portal 359 thereof) confirms the ten voucher numbers and sends the payment 377 (as provided by the buyers of the respective retail item) to the merchant's account.

It will be appreciated that FIGS. 3-6 present a non-limiting detailed example.

FIG. 7 depicts exemplary significant deal components, including pertinent data such as buyer information, merchant information, and the deal description. Buyer information can include, for example, name and contact information, physical address, credit card information, and personal preferences (optional). Merchant information can include, for example, name and contact information, physical address, bank routing/account information, and/or Internet payment account information (e.g., PAYPAL) account information. Deal description information can include, for example, deal name, deal original and negotiated price, deal expiration date, deal volume commitment required, and deal incentive (optional). Other embodiments may have more, less, or different data and/or information as compared to FIG. 7. The data and information in FIG. 7 may be obtained during registration and deal negotiation and/or creation steps, and may be stored, for example, in database 804.

Figure 8:
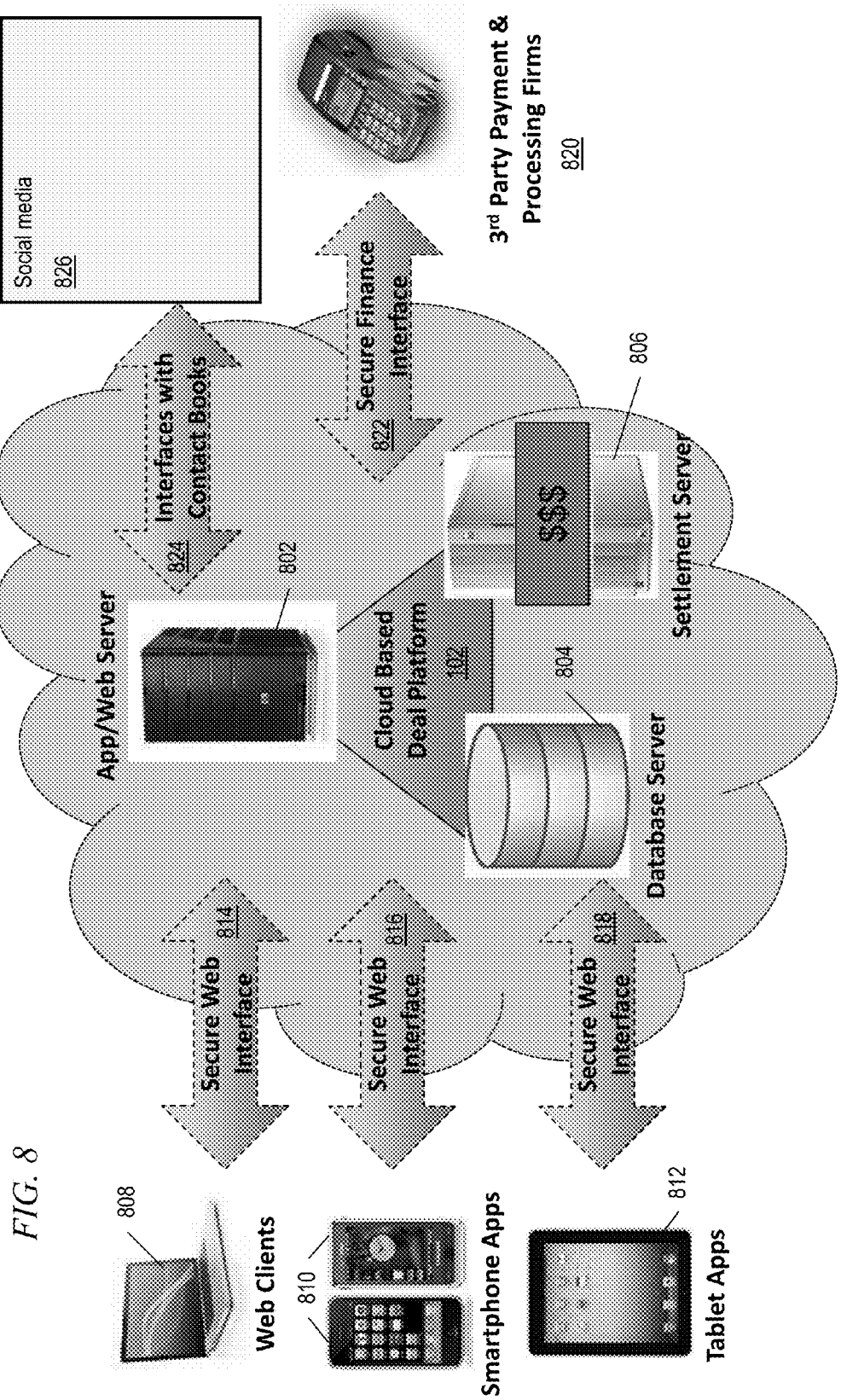
FIG. 8 shows an exemplary system architecture diagram, in accordance with embodiments herein.

FIG. 8 depicts exemplary deal platform software & system components according to embodiments herein. Cloud-based deal platform 102 includes application/web server 802, database server 804, and settlement server 806. Secure web interfaces 814, 816, 818 are provided to, respectively, web clients 808, smartphone apps 810, and tablet apps 812. A secure finance interface 822 is provided to one or more third party payment and processing firms 820. Interfaces 824 are provided to contact books; for example, those of popular social networking sites 826. The skilled artisan is familiar with such functionality and, given the teachings herein, can adapt same to implement one or more embodiments. Of course, access to contact books should only commence upon obtaining appropriate permission.

In FIG. 8, smartphone 810 and/or tablet 812 represent client 351 (although in other embodiments functionality of client 351 could be implemented with a desktop or laptop computer as shown at 808 in FIG. 8); server 353 is represented by server 802; portal 359 has been discussed above; merchant's computer 363 is represented by web client 808 (although in other embodiments functionality of merchant's computer 363 could be implemented with a smartphone 810 and/or tablet 812); and buddy 108 may utilize, for example, client 369 corresponding to smartphone 810 or tablet 812, or computer 367 corresponding to web client 808.

Figure 9:
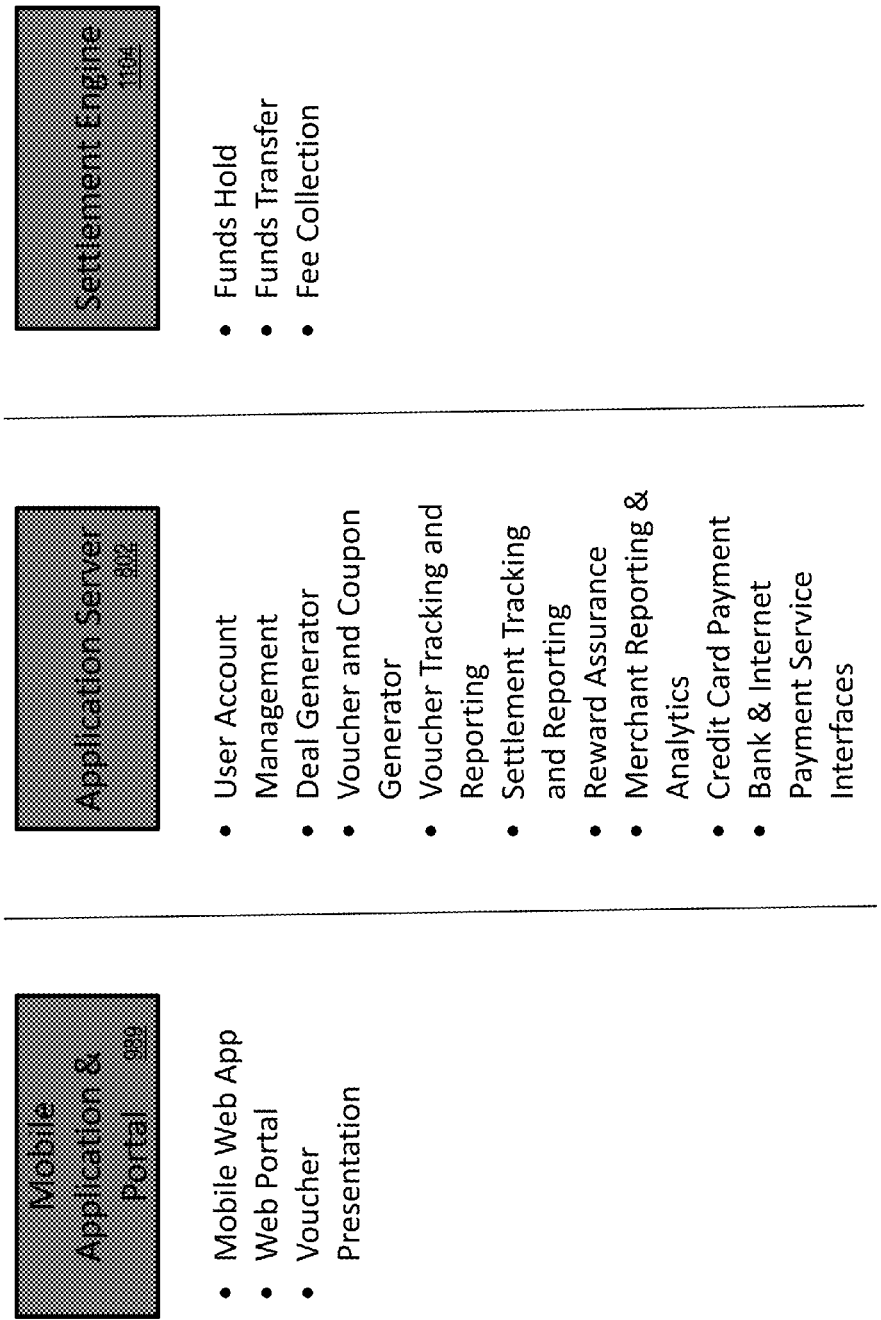
FIG. 9 shows exemplary deal platform software and system components, in accordance with embodiments herein.

Referring now to FIG. 9, Mobile application & portal aspects 989 preferably provide the aforementioned app for mobile devices (e.g., an ANDROID (mark of Google Inc., Mountain View, Calif., USA) and/or APPLE iOS (available from Apple Inc., Cupertino, Calif., USA) mobile web app); a web portal; and/or voucher presentation functionality.

Application server 802 preferably provides user account management, a deal generator, a voucher and coupon generator, voucher tracking and reporting, settlement tracking and reporting, reward assurance, merchant reporting & analytics, credit card payment, and/or bank & Internet payment account (e.g., PAYPAL) interfaces.

Settlement engine 1104 runs on settlement server 806 and provides, for example, funds hold, funds transfer, and/or fee collection functionality.

Recapitulation

It will thus be appreciated that in a non-limiting example of a method, in accordance with embodiments herein, a prospective buyer registers with a deal platform, as described, for example, at 302. This step may be carried out, for example, by an app (i.e., application) executing on a smartphone or tablet of a prospective buyer or by a browser on a computing device of the prospective buyer, interacting with platform 102 over secure web interface 814, 816, or 818. The registration information can be stored in database 804, for example. A further step includes the prospective buyer negotiating a proposed deal with a prospective seller, as described, for example, at 304, 306, using at least some portion of price, terms, and/or conditions proposed by the prospective buyer. This can be carried out in person, via telephone, via e-mail, by instant messaging, by messaging services provided by platform 102, or the like. A still further step includes registering the prospective seller with the deal platform, as described, for example, at steps 308-312. This step may be carried out, for example, by an app on a smartphone or tablet of a prospective buyer or by a browser on a computing device of the prospective buyer, interacting with platform 102 over secure web interface 814, 816, or 818, as well as by an app on the prospective seller's smartphone or tablet or a browser on his or her computing device, interacting with platform 102 over secure web interface 814, 816, or 818.

An even further step includes memorializing the terms of the deal on the platform 102, as described, for example, at 314. The terms can, for example, initially be entered by the prospective buyer, for example, by an app on a smartphone or tablet of a prospective buyer or by a browser on a computing device of the prospective buyer, interacting with platform 102 over secure web interface 814, 816, or 818. The terms can be stored, for example, in database 804. The merchant 110 can assent or propose alternative terms, for example, by an app on the prospective seller's smartphone or tablet or a browser on his or her computing device, interacting with platform 102 over secure web interface 814, 816, or 818. The terms of the deal will generally include certain conditions that must occur for the prospective buyer to be able to obtain the benefit of the deal. For example, the prospective buyer must obtain commitments from a certain number of additional parties to make purchases within a similar time. In at least some cases, these purchases are under the same terms and conditions as that offered to the prospective buyer. The merchant will typically commit to have sufficient goods and/or services available to fulfill the terms of the deal if the buyer carries out his or her end of the bargain.

Once both parties have committed to the deal, the prospective buyer seeks to fulfill the required conditions; e.g., by getting the required number of additional parties (e.g., "Buddies") to make the required purchase in the required time frame, as at 316. This step may be carried out, for example, by an app on a smartphone or tablet of a prospective buyer or by an e-mail program on a computing device of the prospective buyer or a web-based e-mail program executing in a browser on a computing device of the prospective buyer, communicating with prospective additional parties via messaging or e-mail. The message or e-mail can include a link to access a portal feature of platform 102 with details of the deal. Registration information can also be included in the message or e-mail, so that prospective additional parties can obtain the smartphone app if needed. Thus, the step of registering the prospective additional party(ies) with the deal platform, can be carried out, as described, for example, at 318. This step may be carried out, for example, by an app on a smartphone or tablet of a prospective additional party or by a browser on a computing device of the prospective additional party, interacting with platform 102 over secure web interface 814, 816, or 818.

If given ones of the prospective additional party(ies) agree to the terms of the deal, they provide assent and are required to make a financial commitment, as described at 320-322. This step may be carried out, for example, by an app on a smartphone or tablet of a prospective additional party or by a browser on a computing device of the prospective additional party, interacting with platform 102 over secure web interface 814, 816, or 818; within platform 102, settlement engine 1104 may verify the validity of the financial commitment of the prospective additional party(ies) and may hold funds until the deal is completed, when the funds may be transferred to the seller, or until the deal is not completed (e.g., sufficient number of additional parties did not sign up in required time), in which case the funds may be returned to the prospective additional party(ies). See 320-328.

Meanwhile, application server 802 tracks the deal conditions, such as assent of prospective additional party(ies) and timing thereof. Server 802 can include logic which updates data in database 804 at every change and compares the updated data to the deal conditions to see if they have been fulfilled. If the required conditions are met, server 802 facilitates completion of the deal; for example, by facilitating provision of a physical or electronic voucher to the buyer and "Buddies" which allow them to obtain the desired good or service from the seller. Such vouchers can include, for example, a unique code. See step 324. Electronic vouchers can be sent by messaging, e-mail, or the like to smartphones, tablets, computing devices, or the like of the buyer and "Buddies."

The buyer and "Buddies" may redeem the vouchers as seen at 326 (in person) or alternatively the vouchers may be presented electronically, by providing the number over voice telephone, or the like. The seller submits the vouchers to the platform 102 and (optionally, after verification) provides the goods and/or services. This step may be carried out, for example, by any suitable resource such as an app on the seller's smartphone or tablet or a browser on his or her computing device, interacting with platform 102 over secure web interface 814, 816, or 818. Settlement server then effectuates funds transfer to the seller; or if the deal was not completed, effectuates refund to the buyer and "Buddies."

System and Article of Manufacture Details

Embodiments herein can include hardware and/or software aspects. Software includes but is not limited to firmware, resident software, microcode, etc. One or more embodiments as discussed herein can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments as discussed herein can be implemented in the form of an apparatus including a memory and at least one processor that is coupled to the memory and operative to perform, or facilitate performance of, exemplary method steps.

Yet further, in another aspect, one or more embodiments as discussed herein can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

Figure 10:
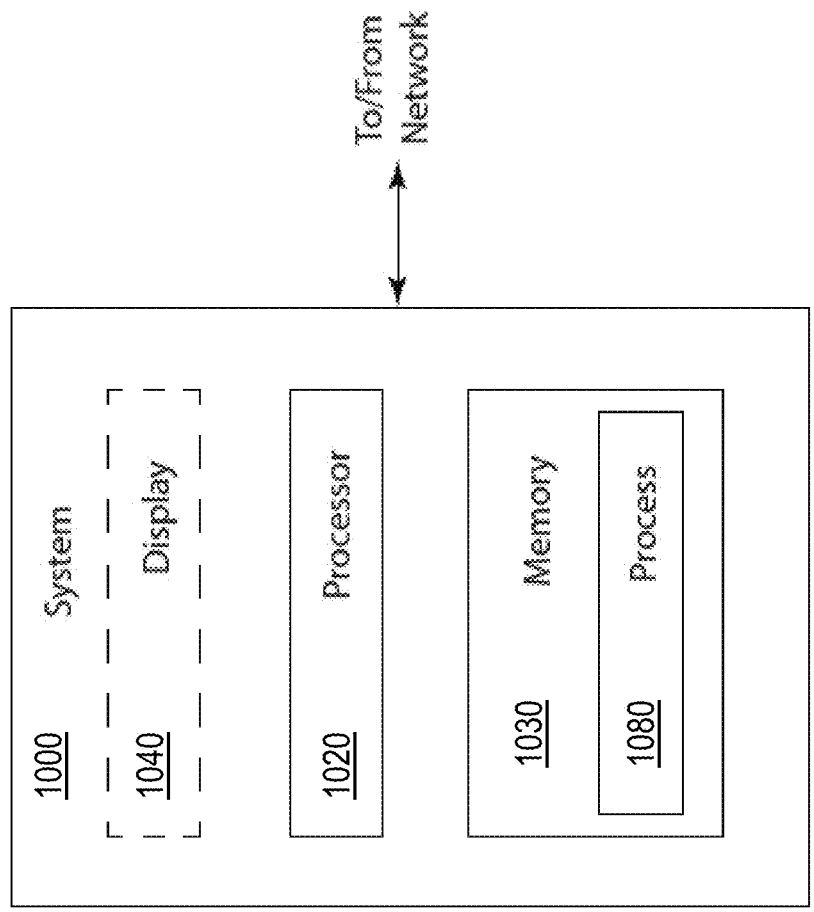
FIG. 10 is a block diagram of a computer system useful in connection with embodiments herein.

FIG. 10 is a block diagram of a system 1000 that can implement at least some as discussed herein, and is representative, for example, of the servers, computers, mobile devices, and the like shown in the figures. As shown in FIG. 10, memory 1030 configures the processor 1020 to implement one or more methods, steps, and functions (collectively, shown as process 1080 in FIG. 10) described herein. The memory 1030 could be distributed or local and the processor 1020 could be distributed or co-located. The same or different processors could carry out different steps.

The memory 1030 could be implemented as an electrical, magnetic or optical memory, or any combination of these or other types of storage devices. It should be noted that if distributed processors are employed, each distributed processor that makes up processor 1020 generally contains its own addressable memory space. It should also be noted that some or all of computer system 1000 can be incorporated into an application-specific or general-use integrated circuit. For example, one or more method steps could be implemented in hardware in an ASIC rather than using firmware. Display 1040 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 1000 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). As used herein, a tangible computer-readable recordable storage medium is defined to encompass a recordable medium, examples of which are set forth above, but is defined to exclude a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that embodiments herein can include one or more computer programs comprising computer program code means adapted to perform one or all of the steps of any methods or claims set forth herein when such program is run, for example, on the server 353, 802, 804, 806; computer/device 363, 367, 808; tablet or smartphone 351, 369, 810, 812, 1299, or the like, and that such program may be embodied on a tangible computer readable recordable storage medium. As used herein, including the claims, a "server" includes a physical data processing system (for example, system 1000 as shown in FIG. 10) running a server program. It will be understood that such a physical server may or may not include a display, keyboard, or other input/output components.

Figure 12:
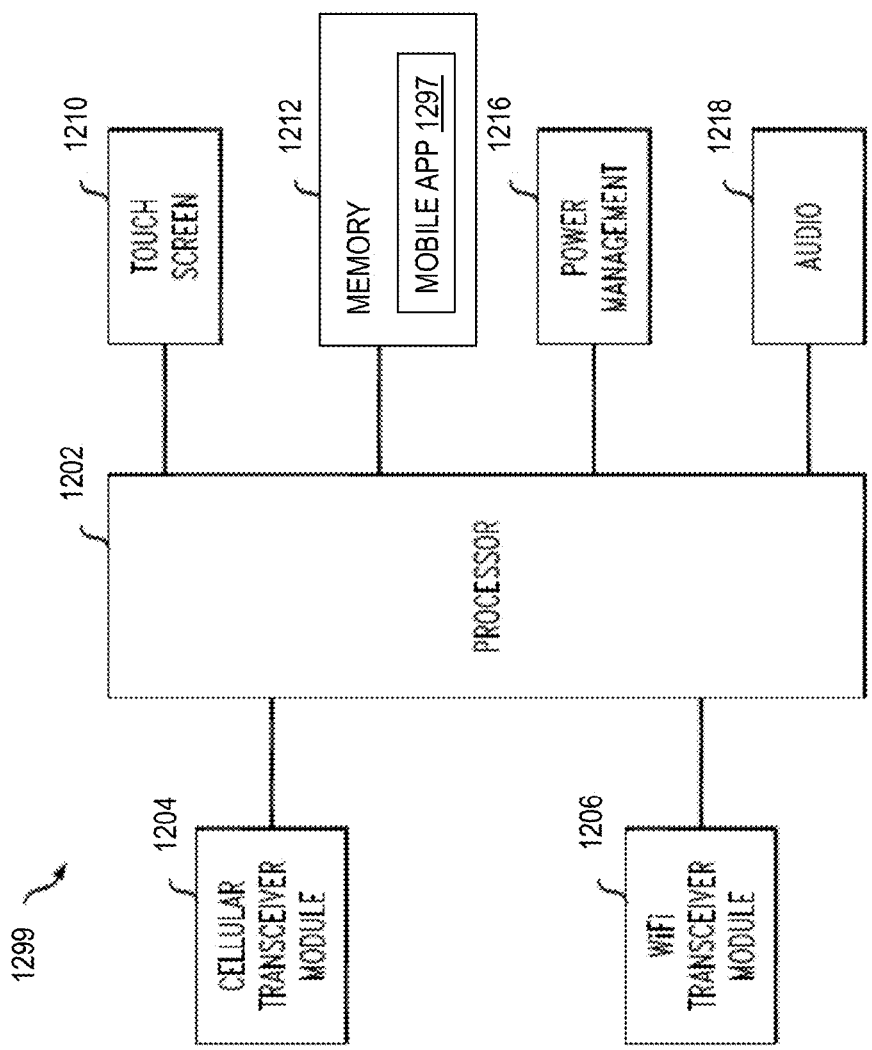
FIG. 12 is an exemplary block diagram of a smart mobile phone or tablet computing device with an application in accordance with embodiments herein.

FIG. 12 is a block diagram of an exemplary smart mobile phone or tablet computing device 1299. Tablet computing device 1299 includes a suitable processor; e.g., a microprocessor 1202. An optional cellular transceiver module 1204 coupled to processor 1202 includes an antenna and appropriate circuitry to send and receive cellular telephone signals, e.g., 3G or 4G. An optional WiFi transceiver module 1206 coupled to processor 1202 includes an antenna and appropriate circuitry to allow tablet computing device 1299 to connect to the Internet via a wireless network access point or hotspot. The skilled artisan will appreciate that "Wi-Fi" is a trademark of the Wi-Fi Alliance and the brand name for products using the IEEE 802.11 family of standards.

One implementation as discussed herein uses the aforementioned "app" 1297 in memory 1212 which when loaded into RAM causes the processor 1202 to implement at least a portion of the functionality described herein.

Touch screen 1210 coupled to processor 1202 is also generally indicative of a variety of devices such as a keypad, another type of display, a mouse or other pointing device, and so on, all of which may or may not be present in one or more embodiments. Memory 1212 coupled to processor 1202 is discussed elsewhere herein; e.g., in connection with memory 1030. Audio module 1218 coupled to processor 1202 includes, for example, an audio coder/decoder (codec), speaker, headphone jack, microphone, and so on. Power management system 1216 can include a battery charger, an interface to a battery, and so on.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. software components of FIG. 8). For example, web clients 808 include browser programs downloading html into the browser. The smartphone and/or tablet apps can include the app downloaded from DADP 301 as described above. Smartphones and tablets can also be provided with browser functionality in addition to or in lieu of the apps. Thus, software modules can include the browser(s) and app(s) and the html to be downloaded to the browser(s). Software modules can be provided to implement app/web server 802, database server 804, and settlement server 806 on the same or different physical machines, optionally with virtualization. In some embodiments, web server 802 interfaces with clients 808, social media 826, and third parties 820, and web server 802 accesses database server 804 as needed; in other embodiments, interface with third parties 820 is via the settlement server 806. Appropriate security should be implemented for the financial transactions. Thus, in some cases, all the interfaces 814, 816, 818, 822, 824 are with server 802 while in other instances, at least interface 822 is with a different server such as server 806. The method steps can then be carried out using the distinct software modules of the system, as described above, executing on one or more hardware processors (e.g., a processor or processors in a DADP 301, a server 353, 802, 804, 806; computer/device 363, 367, 808; tablet or smartphone 351, 369, 810, 812, 1299, or the like). Further, a computer program product can include a tangible computer-readable recordable storage medium with code adapted to be executed to carry out one or more method steps described herein, including the provision of the system with the distinct software modules.

Yet further embodiments herein include computer hardware logic and one or more applications executing thereon. The computer hardware logic receives input from each of one or more prospective buyers. The received input indicates an identity of each of the prospective buyers, corresponding contact information, etc. The computer hardware logic registers the one or more prospective buyers.

The computer hardware logic also receives input from each of one or more prospective sellers. The input from the prospective sellers can indicate an identity of the one or more prospective buyers, corresponding contact information, etc. The computer hardware logic registers the one or more prospective sellers.

As discussed herein, the computer hardware logic such as deal platform 102 facilitates communications and deal-making (coupon, discount offer, etc.) between the prospective buyers and the prospective sellers.

In one embodiment, assume that the computer hardware logic receives a proposal of a coupon (discount offer) from a first party such as buyer 106. In one embodiment, Terms of the proposed coupon indicate a modified purchase price of a retail item for sale by a second party such as merchant 110. The computer hardware logic presents the proposal to the second party. The computer hardware logic then receives approval of the proposed coupon at the modified purchase price. The approval indicates acceptance by the second party (prospective seller) of the modified purchase price.

In response to the approval, computer hardware logic provides notification of the received approval of the coupon to the first party. The first party can specify one or more parties in which to forward the approved coupon deal. In one embodiment, computer hardware logic facilitates forwarding of the notification of the coupon to a group of multiple persons as specified by the first party. For example, the first party can notify his friends of the of the discount offer (such as an approved coupon).

The computer hardware logic can receive feedback from the second party (seller). The feedback can indicate a commitment to purchase the retail item by a number of persons in a respective notified group. Based on the feedback, the computer hardware logic sets a variable to keep track of how many of the multiple persons in the group commit to purchase of the retail item using the approved coupon to purchase the retail item at the modified purchase price. In response to detecting that a magnitude of the variable is above a threshold value, the computer hardware logic generates a signal indicating that the first party is entitled to a reward. Accordingly, if the first party that originates and distributes the approved discount offer reaches a target goal, the first party can receive a respective reward. Thus, prospective buyers are encouraged to propose discount deals for approval.

In accordance with further embodiments, the computer hardware logic transmits notification of the approved coupon to each person in a group of multiple persons as specified by the first party of second party. Over time, and via a count value such as a variable, the computer hardware logic keeps of how many of the persons in a group of notified persons commit to redeeming the coupon to purchase an instance of the retail item from the second party. The computer hardware logic compares the count value to a threshold value. In one non-limiting example embodiment, in response to detecting that the count value is greater than a threshold value, the computer hardware logic generates a notification to each of the persons in the group that commit to purchase of the retail item at the modified purchase price. In one embodiment, the notification indicates confirmation of a sale of the retail item at the modified purchase price as specified by the proposal from the first party.

As mentioned, the first party can be a consumer; the second party can be a retail supplier of the retail item.

In an alternative embodiment, note that the computer hardware logic may compare the count value to a threshold value and determine that the count value is less than a threshold value. In response to detecting that the count value is less than the threshold value, the computer hardware logic provides a notification to the each of the persons in the group (e.g., as specified by the first party or second party or both parties) of a deadline in which to commit to purchasing the retail item at the modified purchase price as specified by the coupon. Accordingly, embodiments herein can include generating an additional notification to encourage consumers to buy a respective produce at a discount price, receive a reward for buying the retail item.

Note that embodiments herein are not limited to reducing a respective price if multiple instances of are purchased. For example, a deal can include purchase of an item at a regular price as normally offered by a seller. However, the deal can provide incentive for a group of buyers by including an extra product for free if a particular retail item is purchased at a regular offered price.

The discount offer and coupons as discussed herein can include any suitable sales agreement.

In addition to notifying prospective buyers of a deadline to purchase a retail item in accordance with an approved coupon, embodiments herein can include notifying the first party of the due date associated with an approved discount offer. For example, the approval of the proposed coupon can have an associated threshold value specifying a predetermined number of instances of the retail item that must be sold in order for the prospective seller to be bound to sell the retail item at the modified purchase price. In one embodiment, the computer hardware logic produces a count value indicating how many persons have committed to purchase of the retail item at the modified purchase price as specified by the coupon proposal. The computer hardware logic compares the count value to the threshold value. In response to detecting that the count value is less than the threshold value, the computer hardware logic initiates a communication to the first second party (e.g., party proposing the coupon). In one embodiment, the notification indicates that additional persons must commit to purchasing the item from the second party in order for the second party to sell the retail item at the modified purchase price as specified by the coupon. Thus, the first party can be put on notice whether a sales goal associated with the discount offer or coupon has been met.

By further way of a non-limiting example, note that the computer hardware logic can be configured to manage funds associated with purchases from the seller. For example, the computer hardware logic can receive funds from one or more person committed to purchase the retail item at the modified purchase price as specified by the coupon. To obtain the reduced price, each of the one or more persons redeems the coupon or voucher with the second party to obtain the modified purchase price. The computer hardware logic can obtain an expiration date associated with the coupon. In response to detecting that a number of persons that have committed to buying the retail item at the purchase price is below a threshold value and that a current date is past the expiration date, the computer hardware logic initiates a refund of the funds to the one or more person because the number of sales required by the deal was not met. Thus, the computer hardware logic as discussed herein can facilitate refund of money if the deal does not go through due to failure of a condition being met.

As mentioned, the computer hardware logic can be used as a platform facilitating distribution of messages to prospective buyers. For example, the computer hardware logic can be configured to receive a notification such as an e-mail message, web page information, etc., from the first party. The notification can include an advertisement of the approved coupon as accepted by the seller. The computer hardware logic initiates distribution of the notification of the advertisement (approved coupon or discount offer) to a social network of persons as specified by the first party. Accordingly, embodiments herein can include ensuring that a deal goes through.

In certain instances, the prospective buyers that register with the computer hardware logic may be amenable to receiving notification of available group deals. In such an instance, the computer hardware logic can receive consent from a group of persons not known to the first party (e.g., the party originating the discount offer proposal). The computer hardware logic receives, from the first party, a notification including an advertisement of the approved coupon. The computer hardware logic initiates distribution of the notification of the approved coupon to the group of persons.

To facilitate execution of a respective discount offer, the computer hardware logic can be configured to create multiple redeemable vouchers for use by prospective buyers to purchase the retail item at the modified purchase price. The computer hardware logic initiates distribution of the redeemable vouchers to a group of persons as specified by the first party. The prospective buyers present the vouchers to the second party (seller) upon commitment by the prospective buyers to purchase the retail item or retail items. The computer hardware logic then receives the vouchers from the second party (seller). As mentioned, the computer hardware logic can receive payment for purchase of the retail item by the group of persons. In response to receiving the vouchers from the second party, the computer hardware logic forwards the payment from the buyers of the retail item to the second party.

In accordance with another embodiment, the computer hardware logic receives input originated from a first consumer. The computer hardware logic generates a discount offer in accordance with the input from the first consumer. The discount offer specifies a conditional modification to an original retail price of a retail item offered for sale by a supplier. The computer hardware logic initiates distribution of the discount offer to one or more consumers including a second consumer. Accordingly, a first consumer can initiate generation of a discount offer for presentation to a processor seller, obtain approval of a discount offer, and then initiate distribution of the discount offer to at least one other consumer.

As previously discussed, the computer hardware logic can be configured to register each of one or more consumers as prospective buyers and register each of one or more suppliers as prospective sellers. The computer hardware logic provides notification to the one or more consumers that the one or more prospective sellers are amenable to receiving coupon offers from the consumer.

Assume that the computer hardware logic receives input originated from a first consumer. The input can be a proposed discount offer for consideration by one or more prospective sellers. The computer hardware logic conveys the input from the first consumer to each of one or more suppliers offering the retail item for sale in a respective retail environment. The input from the first consumer can include proposed terms such as a conditional modification to the retail price.

The computer hardware logic conveys communications between the first consumer and the supplier, the communications facilitating an agreement on final terms of the discount offer. In certain instances, the terms as set forth by the consumer generating the proposal may not be acceptable. One or more prospective sellers may make a counter offer to the consumer of group of consumers.

In response to receiving, from the supplier, acceptance of a conditional modification to the retail price from the supplier, the computer hardware logic generates an approved discount offer in accordance with the input from the first consumer and/or group of con summers. The approved discount offer can specify a conditional modification to a retail price of a retail item offered for sale by a supplier. The approved discount offer can specify additional parameters such as a deadline by which a threshold number of persons must commit to buying in order final office action respective seller to sell the retail item at the reduced price.

The computer hardware logic initiates distribution of the notification of the approved discount offer as originated by the first consumer to a social network of persons associated with the first consumer.

Accordingly, it will be appreciated that one or more embodiments as discussed herein can include a computer program including computer program code means adapted to perform one or all of the steps of any methods or claims set forth herein when such program is implemented on a processor, and that such program may be embodied on a tangible computer readable recordable storage medium. Further, one or more embodiments as discussed herein can include a processor including code adapted to cause the processor to carry out one or more steps of methods or claims set forth herein, together with one or more apparatus elements or features as depicted and described herein.

Figure 13:
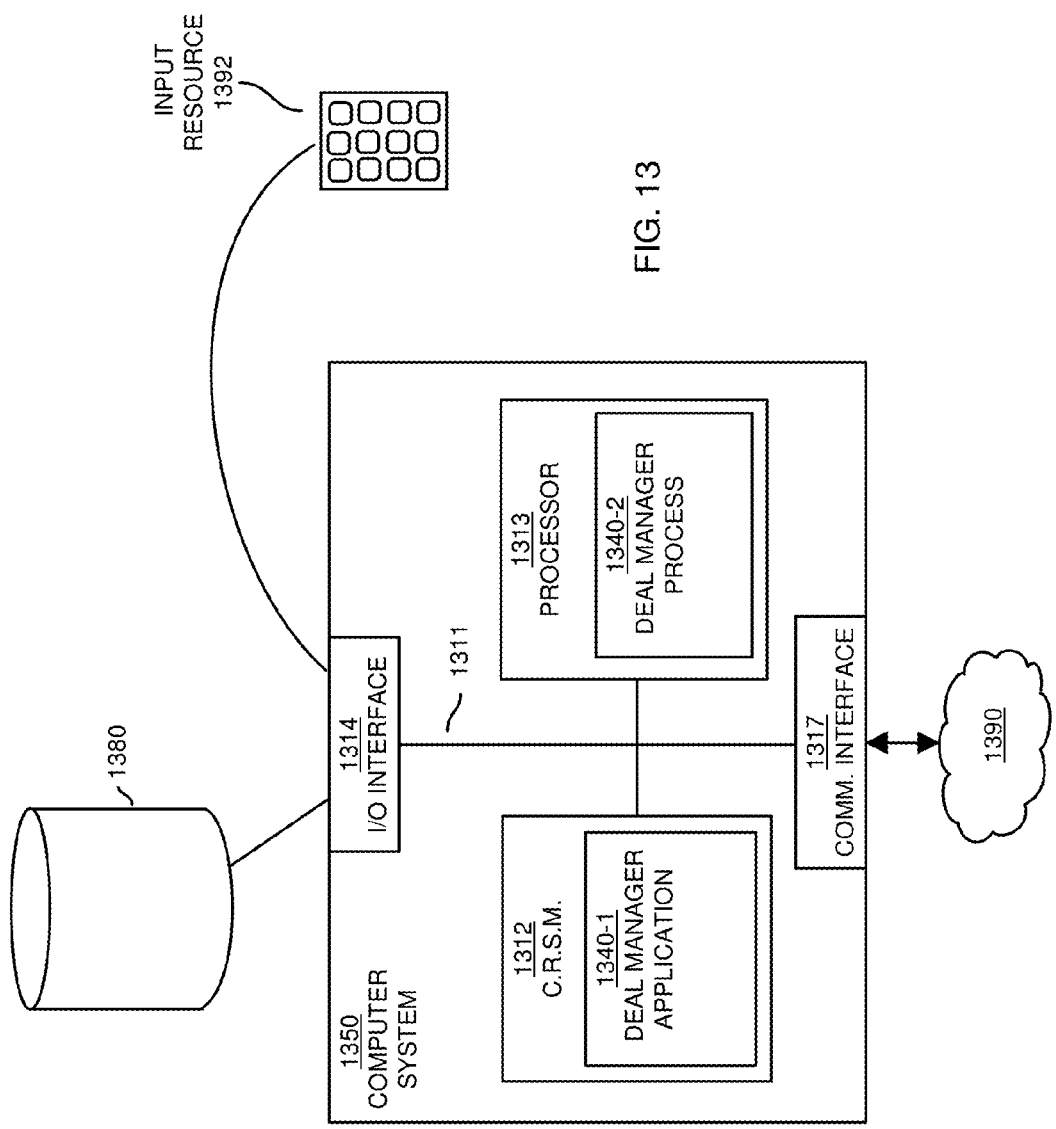
FIG. 13 is an example diagram illustrating an architecture of computer hardware logic according to embodiments herein.

FIG. 13 is an example block diagram of a computer device for implementing any of the operations as discussed herein.

As shown, computer system 1350 such as computer hardware logic of the present example can include an interconnect 1311 that couples computer readable storage media 1312 such as a non-transitory type of media (i.e., any type of hardware storage medium, tangible storage medium, etc.) in which digital information can be stored and retrieved, a processor 1313 (e.g., one or more processor devices or one or more hardware processors), I/O interface 1314, and a communications interface 1317. Communications interface 1317 enables the computer system 1350 to communicate with network elements present in a corresponding network environment 1390.

I/O interface 1314 provides connectivity to a repository 1380 and, if present, other devices such as a playback device, display screen, keypad 1392 (any input resource), a computer mouse, etc.

Computer readable storage medium 1312 can be any hardware storage resource or device such as memory, optical storage, hard drive, floppy disk, etc. In one embodiment, the computer readable storage medium 1312 stores instructions and/or data.

Communications interface 1317 enables the computer system 1350 and processor 1313 to communicate with network elements in network environment 1390 to retrieve information from remote sources such as network elements and communicate with other computers. I/O interface 1314 enables processor 1313 to retrieve stored information from repository 1380.

As shown, computer readable storage media 1312 is encoded with deal manager application 1340-1 (e.g., software, firmware, computer code, etc.) executed by processor 1313. Deal manager application 1340-1 can be configured to include instructions to implement any of the operations as discussed herein.

During operation of one embodiment, processor 1313 accesses computer readable storage media 1312 via the use of interconnect 1311 in order to launch, run, execute, interpret or otherwise perform the instructions in power manager application 1340-1 stored on computer readable storage medium 1312.

Execution of the deal manager application 1340-1 produces processing functionality such as deal manager process 1340-2 in processor 1313. In other words, the deal manager process 1340-2 associated with processor 1313 represents one or more aspects of executing deal manager application 1340-1 within or upon the processor 1313 in the computer system 1350.

Those skilled in the art will understand that the computer system 1350 can include other processes and/or software and hardware components, such as an operating system that controls allocation and use of hardware resources to execute power manager application 1340-1.

In accordance with different embodiments, note that computer system 1350 may be any of various types of devices, including, but not limited to, a mobile computer, a personal computer system, a server resource, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 1350 may reside at any location or can be included in any suitable resource to implement the functionality as discussed herein.

Functionality supported by the different resources will now be discussed via flowcharts in FIGS. 14-15. Note that the steps in the flowcharts below can be executed in any suitable order.

Figure 14:
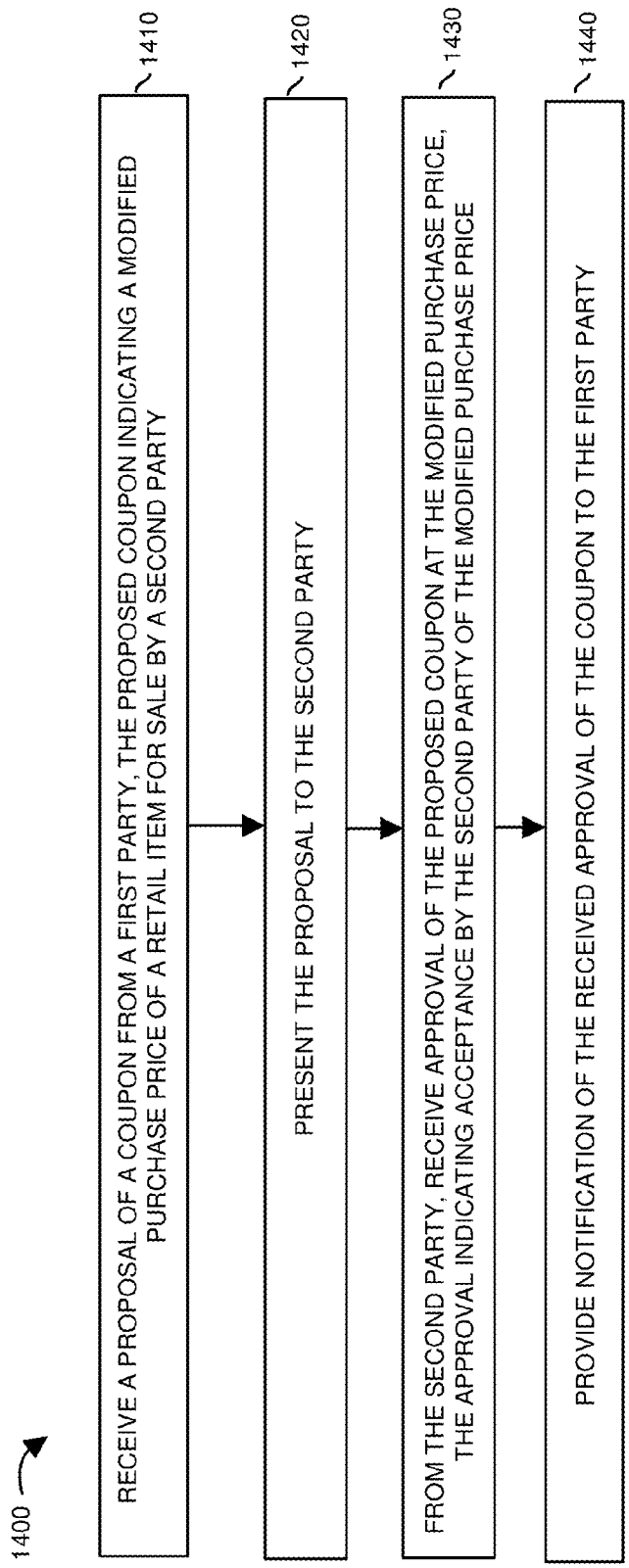
FIG. 14 is an example diagram illustrating a method according to embodiments herein.

FIG. 14 is a flowchart 1400 illustrating an example method according to embodiments. Note that there will be some overlap with respect to concepts as discussed above. The computer hardware logic such as deal platform 102 on which the deal manager application 1340-1 executes or performs any of the operations as discussed herein.

In processing block 1410, the deal manager application 1340-1 receives a proposal of a coupon (such as a discount offer) from a first party such as a consumer. The proposed coupon indicates a modified purchase price of a retail item for sale by a second party such as a supplier.

In processing block 1420, the deal manager application 1340-1 presents the proposal to the second party.

In processing block 1430, from the second party, the deal manager application 1340-1 receives approval of the proposed coupon at the modified purchase price. The approval indicates acceptance by the second party of the modified purchase price.

In processing block 1440, the deal manager application 140-1 provides notification of the received approval of the coupon to the first party.

Figure 15:
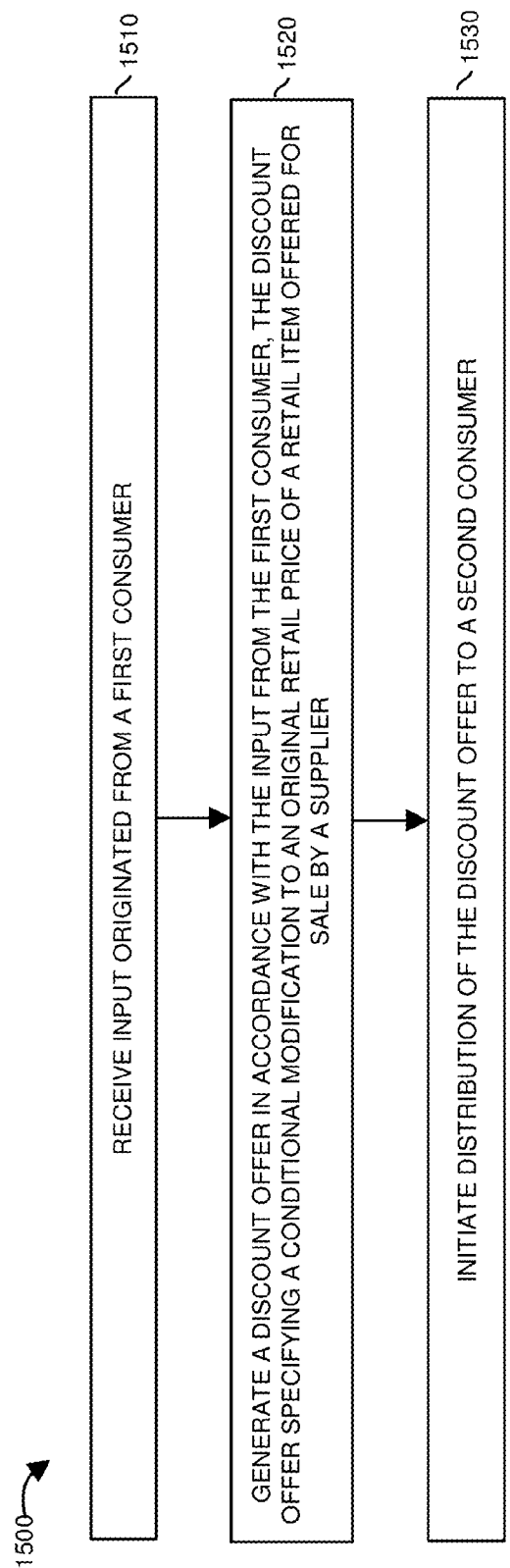
FIG. 15 is an example diagram illustrating a method according to embodiments herein.

FIG. 15 is a flowchart 1500 illustrating an example method according to embodiments. Note that there will be some overlap with respect to concepts as discussed above.

In processing block 1510, the deal manager application 1340-1 receives input originated from a first consumer such as prospective buyer 106.

In processing block 1520, the deal manager application 1340-1 generates a discount offer in accordance with the input from the first consumer. In one embodiment, the discount offer specifies a conditional modification to an original retail price of a retail item offered for sale by a supplier such as merchant 110.

In processing block 1530, the deal manager application 1340-1 initiates distribution of the discount offer to a second consumer such as buddies 108.

Note again that techniques herein are well suited for facilitating and executing retail deals. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method of managing price negotiations and sales via an online management hardware platform accessible by a first party and a second party, the first party being a consumer, the second party being a merchant, the method comprising:

via computer processing hardware in the online management hardware platform, executing operations of:
receiving a discount proposal from a mobile communication device operated by the first party, the first party generating the discount proposal and providing the discount proposal to the online hardware management platform via a client application executing on the mobile communication device, the discount proposal indicating a modified purchase price of a retail item for sale by the second party, wherein the first party physically visits a store from which the second party offers the retail item for sale to consumers;
presenting the discount proposal to the second party;
from the second party, receiving approval of the discount proposal and modified purchase price, the approval indicating acceptance by the second party to sell the retail item at the modified purchase price;
providing electronic notification of the received approval of the discount proposal to the first party;
creating multiple redeemable coupons to purchase the retail item at the modified purchase price as specified by the discount proposal approved by the second party;
initiating distribution of the redeemable coupons to a group of persons as specified by the first party, the redeemable coupons indicating the modified purchase price; and
tracking redemption of the redeemable coupons by the group of persons;

the method further comprising:
at the online management hardware platform, receiving enrollment information and corresponding attributes of the discount proposal from the mobile communication device operated by the first party, the enrollment information indicating the second party, the corresponding attributes of the discount proposal indicating an identity of the retail item and the modified purchase price;
from the online management hardware platform, transmitting an electronic communication to the second party, the electronic communication including a selectable link in which the second party selects to set up a corresponding merchant account with the online management hardware platform;

via the corresponding merchant account, and a portal of the online management hardware platform, notifying the second party of the corresponding attributes of the discount proposal provided by the first party; and wherein receiving the approval of the discount proposal and modified purchase price from the second party further comprises: via the portal of the online management hardware platform, receiving confirmation from the second party that the attributes of the discount proposal have been accepted by the second party.

2. The method as in claim 1, wherein the first party originates and presents the discount proposal to the online management hardware platform, the online management hardware platform facilitating presentation of the discount proposal to the second party via transmission of an email notification to a computer device operated by the second party, the email notification including a selectable link in which to enroll the second party with the online management hardware platform.

3. The method as in claim 2 further comprising:
receiving feedback from the second party, the feedback indicating a commitment by a number of persons in the group to purchase the retail item;
based on the feedback, setting a variable to indicate how many of the multiple persons in the group use the redeemable coupons to purchase the retail item at the modified purchase price; and
in response to detecting that a magnitude of the variable is above a threshold value, generating a signal indicating that the first party is entitled to a reward.

4. The method as in claim 1 further comprising:
over time, producing a count value tracking how many of the persons in the group commit to redeeming the redeemable coupons to purchase an instance of the retail item from the second party.

5. The method as in claim 4 further comprising:
comparing the count value to a threshold value; and
in response to detecting that the count value is greater than the threshold value, generating an individual notification to each of the persons in the group that commit to purchase of the retail item at the modified purchase price, the individual notification indicating confirmation of a sale of the retail item at the modified purchase price as specified by the discount proposal from the first party, the second party being a retail supplier of the retail item.

6. The method as in claim 4 further comprising:
comparing the count value to a threshold value; and
in response to detecting that the count value is less than a threshold value, providing a notification to the each of the persons in the group of a deadline in which to commit to purchasing the retail item at the modified purchase price.

7. The method as in claim 1, wherein the received approval of the discount proposal has an associated threshold value specifying a predetermined number of instances of the retail item that must be sold in order to sell the retail item at the modified purchase price, the method further comprising:

producing a count value indicating how many persons have committed to purchase of the retail item at the modified purchase price as specified by the discount proposal;
comparing the count value to the threshold value; and
in response to detecting that the count value is less than the threshold value, initiating a communication to the second party, the communication indicating that additional persons must commit to purchasing the item from the second party in order for the second party to sell the retail item at the modified purchase price as specified by the coupon.

8. The method as in claim 1 further comprising:
receiving first input, the first input received from the first party and indicating an identity of the first party;
registering the first party as a prospective buyer;
receiving second input, the second input received from the second party and indicating an identity of the second party; and
registering the second party as a prospective seller.

9. The method as in claim 1 further comprising:
receiving funds from a person committed to purchase the retail item at the modified purchase price, the person redeeming the coupon with the second party to obtain the modified purchase price;
obtaining an expiration date associated with the discount proposal; and
in response to detecting that a number of persons that have committed to buying the retail item at the purchase price is below a threshold value and that a current date is past the expiration date, initiating a refund of the funds to the person.

10. The method as in claim 1, wherein the second party is a retail supplier, the method further comprising:
receiving a notification from the first party, the notification from the first party including an advertisement of the approved discount proposal; and
initiating distribution of the notification of the approved discount proposal to a social network of persons as specified by the first party.

11. The method as in claim 1, wherein the second party is a retail supplier, the method further comprising:
receiving consent from a group of persons not known to the first party to receive discount notifications;
from the first party, receiving a notification including an advertisement of the approved discount proposal; and
initiating distribution of the discount notification of the approved discount proposal to the group of persons.

12. The method as in claim 1, wherein the group of persons as specified by the first party presents the redeemable coupons to the second party upon commitment by the group of persons to purchase the retail item, the method further comprising:
and
receiving the redeemable coupons from the second party, the second party receiving the redeemable coupons from the group of persons committing to purchase the retail item at the modified purchase price as specified by the discount proposal.

13. The method as in claim 1 further comprising:
receiving input from the first party negotiating a time frame in which each of the persons in the group are to purchase the retail item.

14. A computer system comprising:
computer processor hardware to manage price negotiations and sales in an online management platform accessible by a first party and a second party, the first party being a consumer, and the second party being a supplier; and a hardware storage resource coupled to the computer processor hardware, the hardware storage resource storing instructions that, when executed by the computer processor hardware, causes the computer processor hardware to:

receive a discount proposal from a mobile communication device operated by the first party, the first party generating the discount proposal and providing the discount proposal to the online management platform via a client application executing on the mobile communication device, the discount proposal indicating a modified purchase price of a retail item for sale by the second party, wherein the first party physically visits a store from which the second party offers the retail item for sale to consumers;

present the discount proposal to the second party;

from the second party, receive approval of the discount proposal and modified purchase price, the approval indicating acceptance by the second party to sell the retail item at the modified purchase price;

provide electronic notification of the received approval of the discount proposal to the first party;

create multiple redeemable coupons to purchase the retail item at the modified purchase price as specified by the discount proposal approved by the second party;

initiate distribution of the redeemable coupons to a group of persons as specified by the first party, the redeemable coupons indicating the modified purchase price; and track redemption of the redeemable coupons by the group of persons;

the computer processor hardware further operable to:

at the online management platform, receive enrollment information and corresponding attributes of the discount proposal from the mobile communication device operated by the first party, the enrollment information indicating the second party, the corresponding attributes of the discount proposal indicating an identity of the retail item and the modified purchase price;

from the online management platform, transmit an electronic communication to the second party, the electronic communication including a selectable link in which the second party selects to set up a corresponding merchant account with the online management hardware platform;

via the corresponding merchant account, and a portal of the online management platform, notify the second party of the corresponding attributes of the discount proposal provided by the first party; and wherein receipt of the approval of the discount proposal and modified purchase price from the second party further comprises: via the portal of the online management platform, receive confirmation from the second party that the attributes of the discount proposal have been accepted by the second party.

15. Computer-readable storage hardware having instructions stored thereon, the instructions, when executed by computer processor hardware, cause the computer processor hardware to:

receive a discount proposal from a mobile communication device operated by a first party, the first party generating a discount proposal and providing the discount proposal to the online management platform via a client application executing on the mobile communication device, the discount proposal indicating a modified purchase price of a retail item for sale by a second party, wherein the first party physically visits a store from which the second party offers the retail item for sale to consumers;

present the discount proposal to the second party;

from the second party, receive approval of the discount proposal and modified purchase price, the approval indicating acceptance by the second party to sell the retail item at the modified purchase price;

provide electronic notification of the received approval of the discount proposal to the first party;

create multiple redeemable coupons to purchase the retail item at the modified purchase price as specified by the discount proposal approved by the second party;

initiate distribution of the redeemable coupons to a group of persons as specified by the first party, the redeemable coupons indicating the modified purchase price; and track redemption of the redeemable coupons by the group of persons;

the computer processor hardware further operable to:

at the online management platform, receive enrollment information and corresponding attributes of the discount proposal from the mobile communication device operated by the first party, the enrollment information indicating the second party, the corresponding attributes of the discount proposal indicating an identity of the retail item and the modified purchase price;

from the online management platform, transmit an electronic communication to the second party, the electronic communication including a selectable link in which the second party selects to set up a corresponding merchant account with the online management hardware platform;

via the corresponding merchant account, and a portal of the online management platform, notify the second party of the corresponding attributes of the discount proposal provided by the first party; and wherein receipt of the approval of the discount proposal and modified purchase price from the second party further comprises: via the portal of the online management platform, receive confirmation from the second party that the attributes of the discount proposal have been accepted by the second party.

16. The method as in claim 1, wherein creating the multiple redeemable coupons includes:

producing a first redeemable coupon to include a first unique code assigned to the first party; and producing a second redeemable coupon to include a second unique code, the second unique code assigned to a particular person in the group, the second unique code different than the first unique code.

17. The method as in claim 16, wherein the first unique code includes a combination of a first sequence of symbols and a second sequence of symbols; and wherein the second unique code includes a combination of the first sequence of symbols and a third sequence of symbols, the third sequence of symbols different than the second sequence of symbols.

18. The method as in claim 1 further comprising:

performing the operations of i) creating the multiple redeemable coupons, ii) initiating distribution of the redeemable coupons, and iii) tracking redemption of the redeemable coupons in response to the approval of the discount proposal approved by the second party and further input from the first party to provide notification of the discount proposal to the group of persons specified by the first party.

19. The method as in claim 1, wherein presenting the discount proposal to the second party further comprises:
in response to receiving the discount proposal from the first party, communicating the discount proposal from the online management hardware platform to the second party without redirecting the discount proposal to the group of persons.

20. The method as in claim 19 further comprising:
in response to the online management hardware platform receiving the approval of the modified purchase price from the second party, initiating distribution of the redeemable coupons to the group of persons as specified by the first party.

21. The method as in claim 1,
wherein the online management hardware platform receives the discount proposal from the first party in response to the second party providing preliminary approval of the discount proposal to the first party.

22. The method as in claim 21 further comprising:
in response to receiving the enrollment information from the first party, enrolling the second party as a candidate merchant from which the retail item is available.

23. The method as in claim 22, wherein providing electronic notification of the received approval of the discount proposal to the first party includes:
notifying, via a message from the online management hardware platform to the application executing on the mobile communication device, the first party of the discount proposal confirmed as being accepted by the second party.

24. The method as in claim 23, wherein the first party operates the application on the mobile communication device to distribute a respective email notification to each corresponding person in the group, each respective email notification including the discount proposal accepted by the second party and a selectable link in which to enroll the corresponding person in the group with the online management hardware platform.

25. The method as in claim 24 further comprising:
subsequent to enrolling each of the persons in the group with the online management hardware platform:
receiving input from each of the persons accepting the discount proposal, the input including payment for the retail item.

26. The method as in claim 25 further comprising:
providing notification of the persons accepting the discount proposal to the first party and the second party; and
initiating distribution of the redeemable coupons to the group of persons in response to detecting that a threshold number of the persons in the group agrees to purchasing the retail item at the modified purchase price as specified by the discount proposal.

27. The method as in claim 21 further comprising:
prior to presenting the discount proposal to the second party:
receiving input from the application executing on the mobile communication device, the application including contact information of the second party; and
transmitting a communication from the online management hardware platform to a computer device operated by the second party, the communication including a link in which to enroll the second party with the online management hardware platform as a merchant.

* * * * *